United States Patent
Stall

[11] Patent Number: 5,417,353
[45] Date of Patent: May 23, 1995

[54] MOWER CADDY

[76] Inventor: Brian K. Stall, 21072 Country Creek Dr., Boca Raton, Fla. 33428

[21] Appl. No.: 306,377

[22] Filed: Sep. 15, 1994

[51] Int. Cl.$^6$ .............................................. B65D 25/20
[52] U.S. Cl. .............................................. 224/42.46 R
[58] Field of Search ................. 224/42.46 R, 273, 0.5, 224/36, 30 A; 248/693, 318; 280/304.5

[56] References Cited

U.S. PATENT DOCUMENTS

| | | | |
|---|---|---|---|
| 2,558,372 | 6/1951 | Nidermayer, Jr. | 224/42.46 R |
| 4,186,859 | 2/1980 | Frankfort et al. | 224/42.46 R X |
| 4,339,061 | 7/1982 | Dunn | 224/42.46 R X |
| 5,040,711 | 8/1991 | Neiderhauser et al. | 224/42.46 R |

FOREIGN PATENT DOCUMENTS

| | | | |
|---|---|---|---|
| 197750 | 8/1938 | Switzerland | 224/42.46 R |
| 242068 | 9/1946 | Switzerland | 224/42.46 R |

Primary Examiner—Renee S. Luebke
Attorney, Agent, or Firm—Walter F. Wessendorf, Jr.

[57] ABSTRACT

A mower caddy is adjustably and releasably attached to the lateral arms and handle of a lawn mower, such that the mower caddy, structurally, does not physically interfere with the operator's operations of or in connection with the lawn mower. The structurally compartmentalized mower caddy provides convenient, neat and ready access to the various articles stored within the mower caddy.

2 Claims, 2 Drawing Sheets

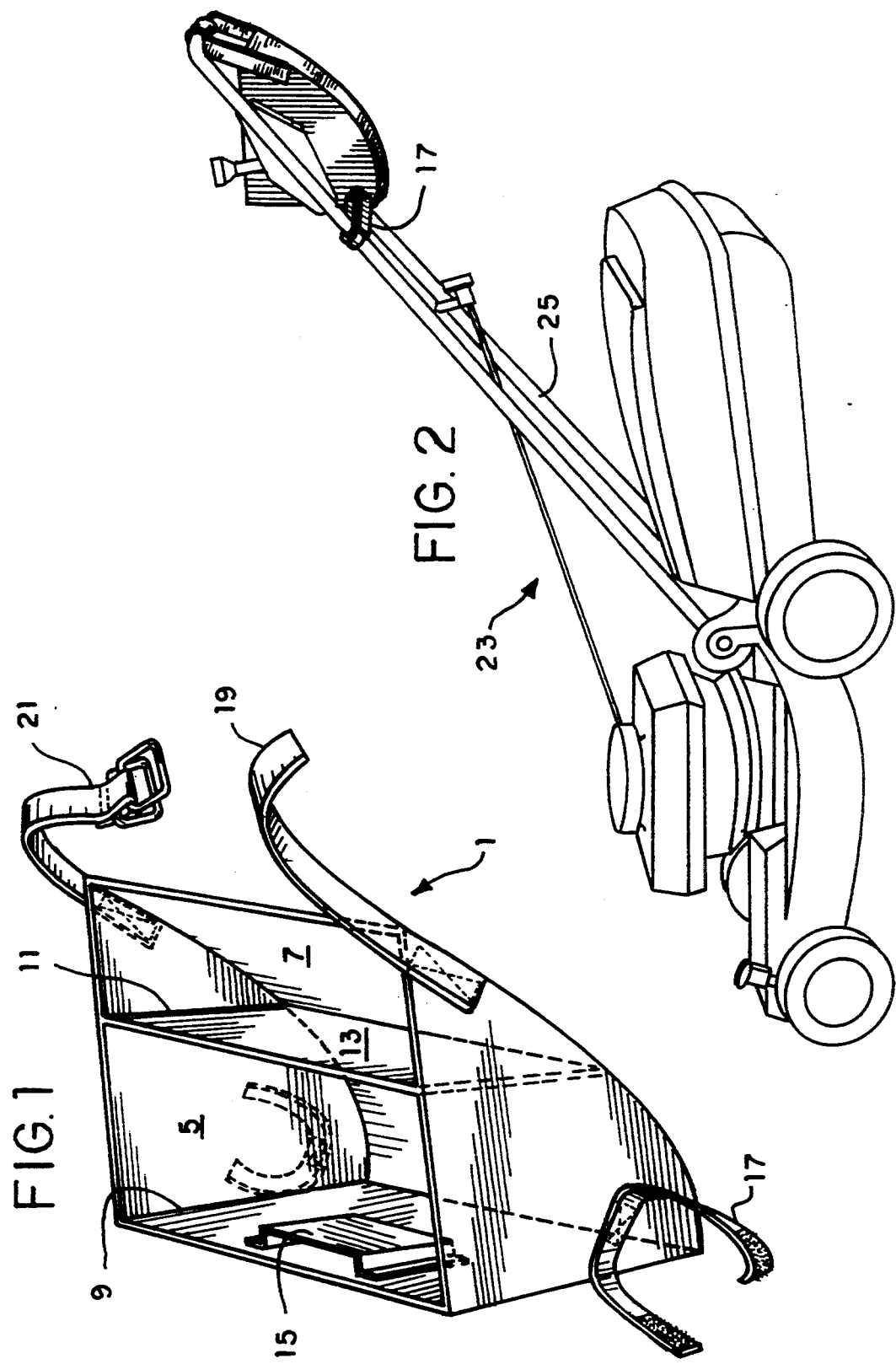

MOWER CADDY

BACKGROUND

1. Technical Field

This invention relates to a mower caddy or article carrying receptacle for use in storing articles therein.

2. Background

The problems in the art to which this invention appertains are the needs for a mower caddy that can be attached to the lateral arms and handle of a conventional lawn mower; the need for such a mower caddy that, so attached, will not physically interfere either with the functional operations of the lawn mower or physically interfere with a human operator in his operation of the lawn mower; and the need for a mower caddy that can conveniently store articles, such as tools, plastic leaf bags, twist ties, therein.

SUMMARY OF THE INVENTION

This invention contributes to the solutions of the discussed problems of the art by providing a mower caddy or article carrying receptacle, of integral construction, that has a front-facing wall, lateral side walls and an arcuately curved rear wall in common therewith. The side walls carry hook-and-loop-fastening mounting strips for attachment to the lawn-mower's lateral arms. The side walls further carry a belt strap portion and a belt strap buckle portion, that when assembled, form a loop that is attached to the lawn-mower's handle via hook-and-loop-fastening mounting strips, to allow vertical positioning of the mower caddy. The mower caddy has compartments within which to store articles, such as tools, plastic leaf bags, twist ties.

BRIEF DESCRIPTION OF THE DRAWINGS

These objects and other objects of the invention should be discerned and appreciated by reference to the "DETAILED DESCRIPTION OF THE PREFERRED EMBODIMENT" taken in conjunction with the drawings, wherein like reference numerals refer to similar elements throughout the several views, in which: FIG. 1 is a perspective view of the mower caddy; FIG. 2 is a side view showing the mower caddy attached to a lawn mower.

DETAILED DESCRIPTION OF THE PREFERRED EMBODIMENT

Figure 4:
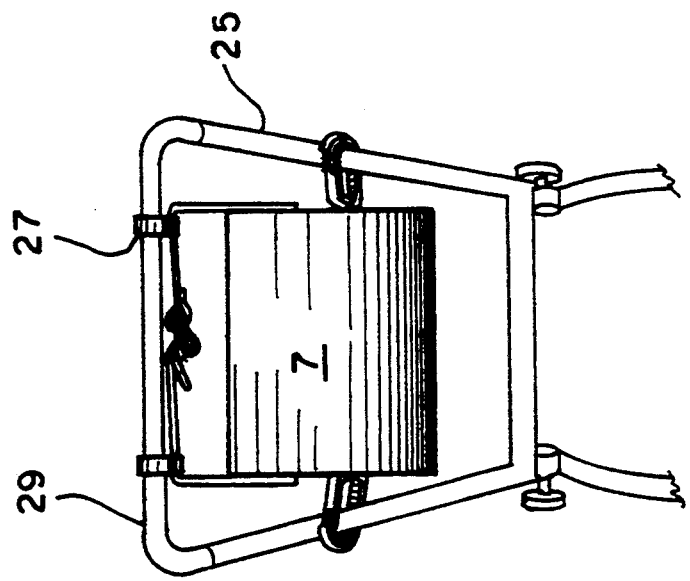
FIG. 4 is a rear view showing the mower caddy attached to such lateral arms and handle.

In FIG. 1 of the drawings, reference numeral 1 generally refers to the mower caddy 1. Mower caddy 1, made of suitable waterproof fabric material, has an upstanding front-facing wall 3, lateral side walls 5 and an arcuately curved rear wall 7. Front compartment 9 for the storage of plastic leaf bags and a rear compartment 11 for the storage of miscellaneous articles, such as tools, are formed by an intermediate panel 13. The rear portion of the front-facing wall 3 has a pocket 15 attached thereto, such as by adhesive, to store twist ties. Flexible hook-and-loop-fastening mounting strips 17 are suitably stitched to the lateral side walls 5, as shown. Belt strap portion 19 and belt strap buckle portion 21 are each suitably stitched to the lateral side walls 5, as shown.

In FIG. 2, reference numeral 23 generally refers to a conventional lawn mower, to which the mower caddy 1 is attached.

Figure 3:
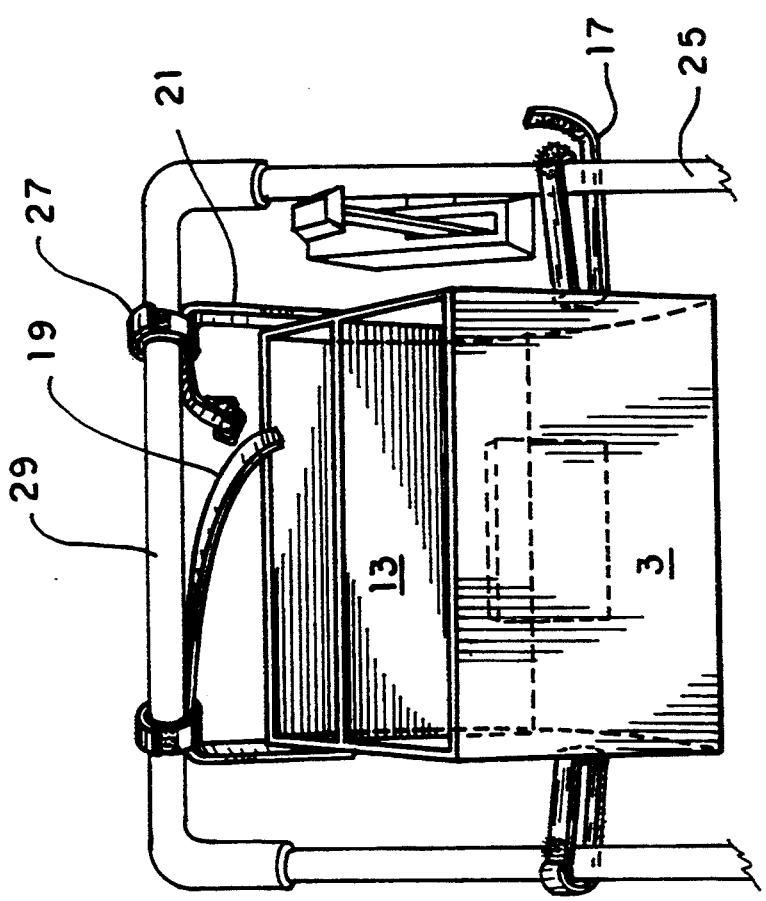
FIG. 3 is a front view showing the mower caddy attached to the lateral arms and handle of the lawn mower.

As shown more discernably in FIGS. 3 and 4, releasable hook-and-loop-fastening mounting strips 17 serve to adjustably attach the mower caddy 1 to the lawnmower's lateral arms 25. The belt strap portion 19 is conventionally connected, as shown, with the belt strap buckle portion 21 to form a loop. Releasable hook-and-loop-fastening mounting strips 27 serve to adjustably attach such loop to the handle 29 of the lawn mower 23. Preparatory to so attaching the loop to the handle 29, the length of loop formed by the belt strap portion 19 and the belt strap buckle portion 21 is appropriately adjusted, such that, when such loop is thusly attached via the hook-and-loop-fastening mounting strips 27 to the handle 29, the vertical height of the mower caddy 1 with respect to the handle 29 will be at the height preferred by a human operator in connection with his functional operation of the lawn mower 23.

Allowing the human operator to simply and quickly dispose the mower caddy 1 at such vertical height desired by the human operator will not physically interfere with the human operator's operations of or in connection with the lawn mower 23, such as starting the lawn mower 23, maneuvering it in tight places in mowing the lawn, emptying the grass bag. The arcuately curved rear wall 7 serves to avoid physical obstruction to the human operator's knees, especially when he is required, in mowing the lawn, to maneuver the lawn mower 23 in spatially tight or restricted places. The front compartment 9, rear compartment 11 and pocket 15 provide convenient, neat and ready access to the respective plastic leaf bags, tools and twist ties stored therein.

I claim:

1. An article carrying receptacle for storing articles therein, which receptacle, as attached to a conventional lawn mower's lateral arms and handle, is free from any physical interference with a human operator's body in operations of or in connection with the lawn mower; the receptacle, of integral construction, having a front-facing wall, lateral side walls and an arcuately curved rear wall, the side walls carrying first hook-and-loop-fastening mounting means for releasably and adjustably attaching the receptacle's side walls to the lawn-mower's lateral arms, and the side walls further carrying adjustable belt straps for releasable and adjustable attachment to the lawn-mower's handle via second hook-and-loop-fastening mounting means to allow vertical disposition of the receptacle relative to the lawn-mower's handle.

2. An article carrying receptacle in accordance with claim 1, wherein the receptacle has integral compartment means within which to store the articles.

* * * * *